(12) United States Patent
Smith et al.

(10) Patent No.: US 9,731,562 B2
(45) Date of Patent: Aug. 15, 2017

(54) WHEEL ASSEMBLY FOR AN AGRICULTURAL IMPLEMENT AND METHOD OF FORMING SAME

(71) Applicant: CTP, Transportation Products, LLC, Franklin, TN (US)

(72) Inventors: Christopher Smith, Cedar Grove, TN (US); Kevin McMichen, Medina, TN (US); Marc Guske, Grand Rapids, MI (US)

(73) Assignee: THE CARLSTAR GROUP, LLC, Franklin, TN (US)

( * ) Notice: Subject to any disclaimer, the term of this patent is extended or adjusted under 35 U.S.C. 154(b) by 108 days.

(21) Appl. No.: 14/525,817

(22) Filed: Oct. 28, 2014

(65) Prior Publication Data

US 2016/0114623 A1 Apr. 28, 2016

(51) Int. Cl.
| | | |
|---|---|---|
| *B60B 5/02* | (2006.01) | |
| *B60C 15/02* | (2006.01) | |
| *B60B 3/08* | (2006.01) | |
| *B60B 3/14* | (2006.01) | |
| *B60B 25/00* | (2006.01) | |

(52) U.S. Cl.
CPC ............ *B60C 15/0213* (2013.01); *B60B 3/08* (2013.01); *B60B 3/147* (2013.01); *B60B 25/002* (2013.01); *B60B 3/082* (2013.01); *B60B 25/008* (2013.01); *B60B 2900/521* (2013.01); *B60B 2900/523* (2013.01); *B60Y 2200/22* (2013.01)

(58) Field of Classification Search
CPC ....... A63C 17/223; B60B 3/087; B60B 3/082; B60B 3/08

USPC ................ 301/5.306, 5.309, 64.301, 64.307
See application file for complete search history.

(56) References Cited

U.S. PATENT DOCUMENTS

| | | | | |
|---|---|---|---|---|
| 1,733,081 A | * | 10/1929 | Leach ....................... | B60B 9/20 |
| | | | | 152/56 |
| 3,827,792 A | * | 8/1974 | Hollins ..................... | B60B 3/08 |
| | | | | 152/319 |
| 4,376,554 A | * | 3/1983 | Schumacher ........... | B60B 3/004 |
| | | | | 301/110 |
| 5,308,152 A | * | 5/1994 | Ho ......................... | A63C 17/06 |
| | | | | 152/323 |
| 5,520,232 A | | 5/1996 | Fukutake et al. | |

(Continued)

FOREIGN PATENT DOCUMENTS

GB 2002641 A 7/1978

OTHER PUBLICATIONS

International Search Report and Written Opinion date mailed Jan. 14, 2016; International PCT Application No. PCT/US15/57387.

*Primary Examiner* — Jeffrey J Restifo
(74) *Attorney, Agent, or Firm* — McGuireWoods LLP (57) ABSTRACT

A wheel assembly for an agricultural implement and method of forming the agricultural wheel assembly includes a tire body, an annular ring, and a hub. The tire body has an inner wall and an outer wall collectively defining an annular pocket therebetween. The inner wall defines a central, axial hole through the tire body and has a circumferential slot extending therethrough. The annular ring is positioned within the circumferential slot and secured to the tire body such that the annular ring projects radially inward through the circumferential slot to the axial hole. As such, the annular ring is configured to operatively engage the hub such that the tire body mounts to the hub.

19 Claims, 8 Drawing Sheets

(56) References Cited

U.S. PATENT DOCUMENTS

| | | | | |
|---|---|---|---|---|
| 5,533,793 A * | 7/1996 | Walker | | B60B 3/002 |
| | | | | 152/453 |
| 5,551,763 A | 9/1996 | Alsman | | |
| 5,564,790 A * | 10/1996 | Lekavich | | A63C 17/24 |
| | | | | 152/382 |
| 5,660,447 A * | 8/1997 | Angelici | | A63C 17/223 |
| | | | | 152/323 |
| 5,667,280 A * | 9/1997 | Hansen | | A63C 17/223 |
| | | | | 152/323 |
| 6,000,762 A * | 12/1999 | Chang | | B60B 3/08 |
| | | | | 152/DIG. 10 |
| 6,227,622 B1 * | 5/2001 | Roderick | | A63C 17/223 |
| | | | | 152/323 |
| 6,286,907 B1 * | 9/2001 | Meader | | B60C 7/24 |
| | | | | 152/393 |
| 6,303,060 B1 * | 10/2001 | Lobo | | B29C 44/1271 |
| | | | | 152/246 |
| 6,619,758 B1 * | 9/2003 | Ross | | A63C 17/22 |
| | | | | 301/5.309 |
| 8,911,025 B2 * | 12/2014 | Rota | | B60C 7/10 |
| | | | | 152/379.3 |
| 8,967,305 B2 * | 3/2015 | Manganaro | | B60K 7/0007 |
| | | | | 180/165 |
| 2003/0015908 A1 * | 1/2003 | Young | | A63C 17/223 |
| | | | | 301/5.309 |
| 2006/0232123 A1 * | 10/2006 | Ross | | A63C 17/223 |
| | | | | 301/5.7 |
| 2010/0251947 A1 * | 10/2010 | Mariman | | A01C 5/06 |
| | | | | 111/149 |
| 2011/0095597 A1 * | 4/2011 | Knowles | | B60B 3/08 |
| | | | | 301/64.303 |
| 2012/0285595 A1 * | 11/2012 | Su | | B60C 7/105 |
| | | | | 152/310 |

* cited by examiner

WHEEL ASSEMBLY FOR AN AGRICULTURAL IMPLEMENT AND METHOD OF FORMING SAME

TECHNICAL FIELD

The present invention relates generally to a wheel assembly and method of forming the wheel assembly, and more particularly, to a gauge wheel assembly for an agricultural implement.

BACKGROUND

Wheel assemblies generally include an annular tire mounted to an outer periphery of a central hub, which may also be referred to as a rim. Typically, the tire is formed from rubber into an annular shape. While such wheel assemblies are generally known, most wheel assemblies are uniquely structured to accommodate particular uses and industries. For example, an agricultural planter requires many unique wheel assemblies, each with its own distinctive features, to successfully plant seeds in a field. One such wheel assembly for an agricultural planter is a gauge wheel assembly. The gauge wheel assembly is uniquely sized and structured for controlling a working depth of the agricultural planter, pressing topsoil to close the seed within the seedbed, and inhibiting topsoil from adhering to an outer periphery of the gauge wheel assembly for maintaining consistency of the working depth and seedbed closure. In contrast, other wheel assemblies for the agricultural planter may be uniquely configured for other uses, such as supporting the weight of the agricultural planter itself or even transmitting force as a component of a friction drive system.

SUMMARY

An exemplary embodiment of a wheel assembly for an agricultural implement includes a tire body and an annular ring. The tire body has an inner wall and an outer wall collectively defining an annular pocket therebetween. The inner wall defines a central, axial hole through the tire body for receiving a hub. In addition, the tire body also has a circumferential slot extending through the inner wall of the tire body from the annular pocket to the axial hole. The annular ring is received within the annular pocket and projects radially inward through the circumferential slot to the axial hole. The annular ring is configured to operatively engage the hub such that the tire body mounts to the hub.

In one aspect, the annular ring may include a band portion and a tab portion. The band portion is captured within the annular pocket such that the tab portion projects radially inward from the band portion and defines a generally T-shaped cross-section. In turn, the tab portion projects through the annular slot and beyond the inner wall. The band portion may include an outer circumferential surface configured to support the outer wall of the tire body being compressed toward the inner wall, whereas the tab portion is configured to operatively engage the hub.

According to an exemplary embodiment, the annular ring may be defined by a single, unitary ring body. Also, the tire body may be formed from a first material and the annular ring may be formed from a second material that is different from the first material. Alternatively, according to another exemplary embodiment, the annular ring may include a first ring body and a second ring body that is separable from the first ring body. By way of yet another exemplary embodi-

2 ment, the annular ring may be integrally formed as a unitary piece with at least a portion of a hub.

Another exemplary embodiment of the wheel assembly may include a hub defining an annular groove. The annular groove may be configured to capture the annular ring therein for mounting the tire body onto the hub. More particularly, the hub may include a first hub body connected to a second hub body to collectively define the annular groove therebetween.

To form the agricultural wheel assembly having a tire body, an annular ring, and a hub, an exemplary method may include positioning the annular ring within a circumferential slot extending through the tire body. The tire body includes an inner wall and an outer wall collectively defining an annular pocket therebetween. In addition, the inner wall defines a central, axial hole through the tire body. The circumferential slot extends through the inner wall from the annular pocket to the axial hole. The method may further include securing the annular ring to the tire body such that the annular ring projects radially inward through the circumferential slot to the axial hole.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below serve to explain the invention.

FIG. 6 is a cross-section view of the wheel assembly FIG. 2 taken along section line 5-5 of.

DETAILED DESCRIPTION

Despite the numerous uses and respective variations of the wheel assemblies described above, present tires and rims are, to some extent, limited by the splices required to form the tire itself. Tire splices are subject to manufacturing variations and, in turn, defects, which increase costs for both the tire manufacturer and the consumer. On one hand, if the tire splice is too heavy or non-symmetrical, the tire may be subject to improper force distribution. On the other hand, if the tire splice is too light, the tire may suffer from visual defects or structural defects, which may cause tire failure. In any case, these variations tend to result in a reduction of the useful life of the wheel assembly.

Figure 1:
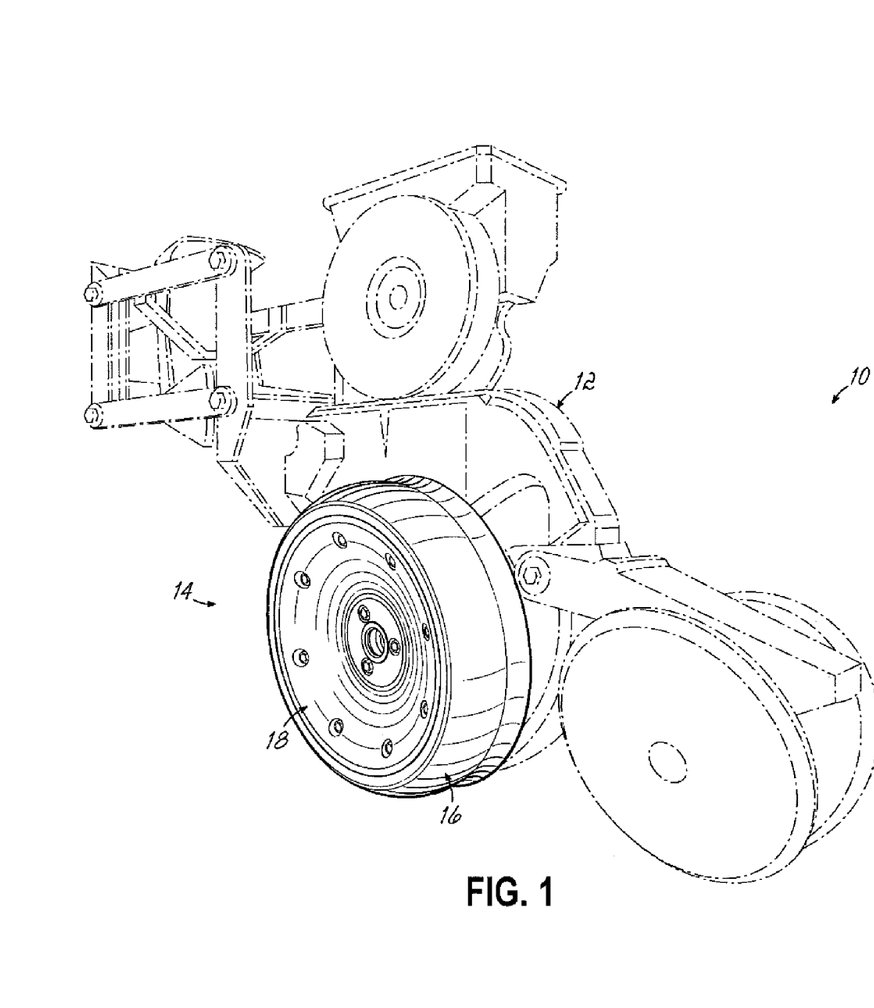
FIG. 1 is a perspective view of an agricultural implement including a first exemplary embodiment of a wheel assembly in accordance with the principles of the present disclosure.
Figure 2:
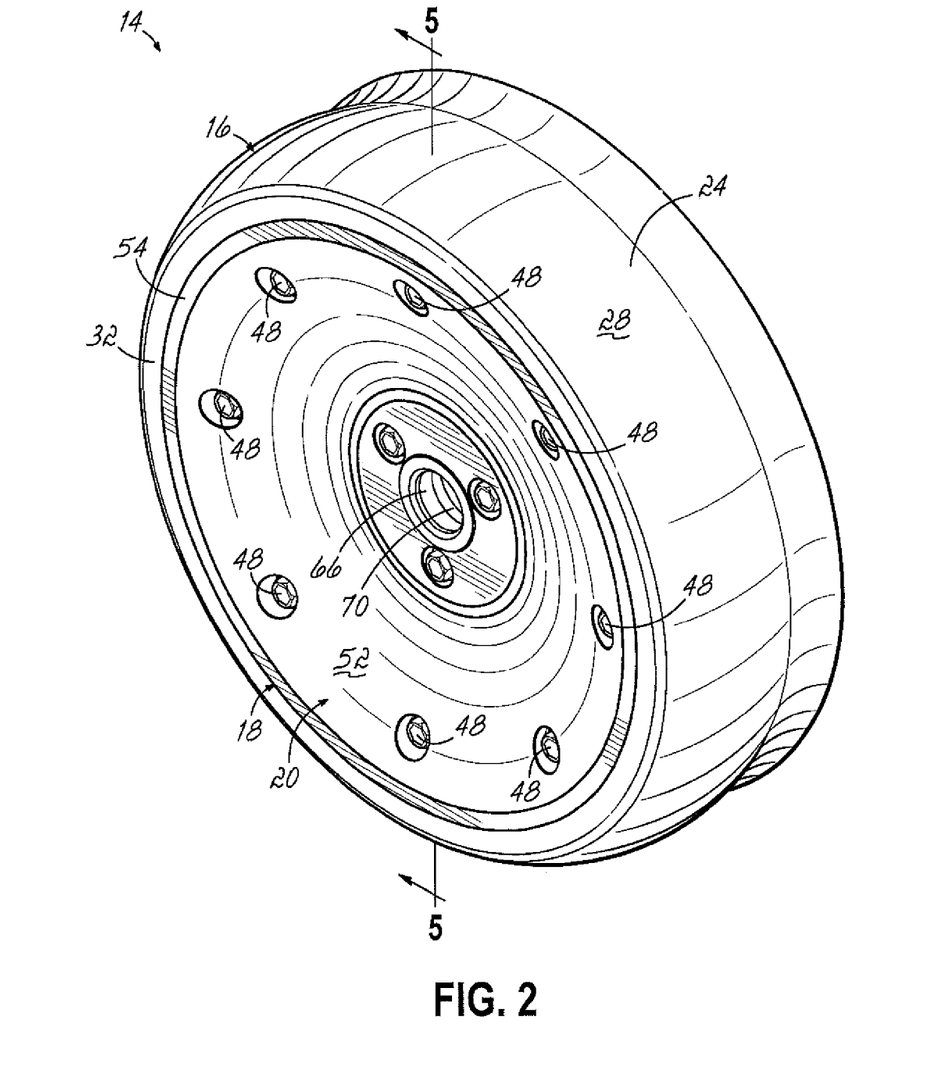
FIG. 2 is a perspective view of the wheel assembly of FIG. 1.

With reference to FIG. 1 and FIG. 2, an exemplary embodiment of an agricultural implement is an agricultural seeder 10 that includes at least one row crop unit 12 having a wheel assembly 14. The wheel assembly 14 has a tire body 16 and a hub 18, which may also be referred to as a rim. According to the exemplary embodiment, the tire body 16 is a semi-pneumatic tire body 16 and is generally unitarily formed (by, for example, molding) to not include a splice or spliced portion for assembly thereof. By way of further example, the hub 18 discussed herein is a clam shell, or hollow, rim, which generally includes a first hub body in the form of an outer hub half 20 and a second hub body in the form of an inner hub half 22 (see FIG. 3). While the exemplary wheel assembly 14 shown and described herein is a gauge wheel assembly 14 for the row crop unit 12, it will be appreciated that any type of tire body and hub may be used in accordance with the principles disclosed herein. The tire body 16 is generally free of splices; however, it will be further appreciated that an alternative embodiment of a wheel assembly may include one or more splices in an embodiment in which the tire body is formed from two or more molded parts that are joined together. Accordingly, tire bodies and wheel assemblies disclosed herein are not intended to be limited to the gauge wheel assembly 14 for use with the agricultural seeder 10 and may instead be used in other agricultural implements or other non-agricultural applications. In addition, the tire body may alternatively be a pneumatic tire body, and the hub may alternatively be unitarily formed and/or have a plurality of spokes. As discussed herein, the terms "outer" and "inner" generally refer to relative positions from a central axis of the wheel assembly 14 and/or relative positions from the exemplary row crop unit 12. It will be appreciated that the terms "outer" and "inner" are merely illustrative and are not intended as limiting.

Figure 3:
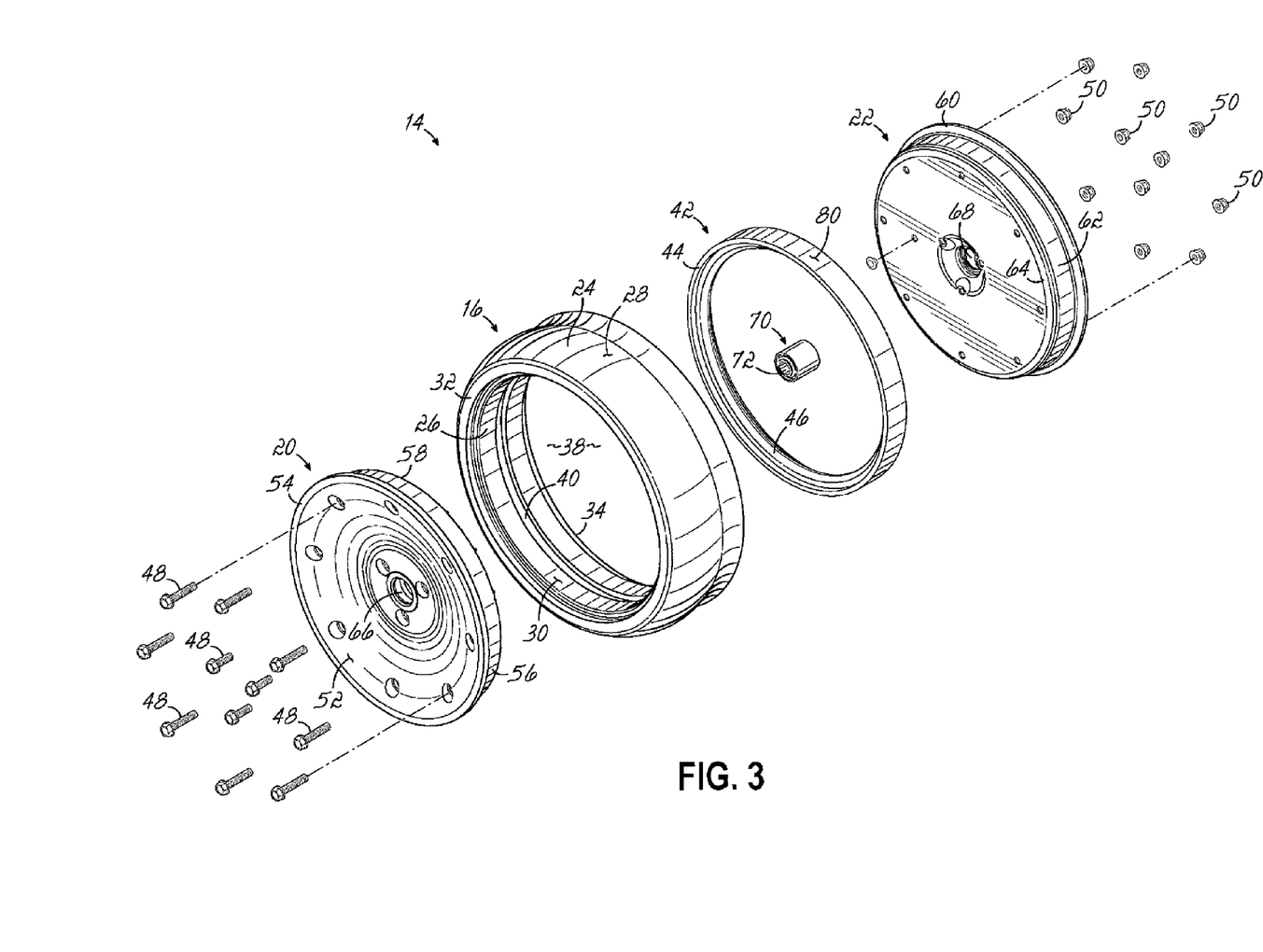
FIG. 3 is an exploded perspective view of the wheel assembly of FIG. 1.

FIG. 2 and FIG. 3 show the exemplary wheel assembly 14 having the tire body 16 and hub 18 in greater detail. The tire body 16 more particularly includes an outer wall 24 and an opposing inner wall 26. Both the outer wall 24 and inner wall 26 have respective outer and inner surfaces 28, 30. The tire body 16 also includes opposing first and second sidewalls such as the outer and inner sidewalls 32, 34. The outer and inner sidewalls 32, 34 extend radially inward from the outer surface 28 to the inner surface 30 to secure the outer wall 24 relative to the inner wall 26. In turn, the outer and inner walls 24, 26 and outer and inner sidewalls 32, 34 collectively define a cavity, referenced herein as annular pocket 36 (see FIG. 5) therebetween. The inner surface 30 further defines a central, axial hole 38 configured for receiving the hub 18. In this embodiment, the axial hole 38 extends through the tire body 16 generally parallel to the outer and inner walls 24, 26 and generally transverse to the outer and inner sidewalls 32, 34.

Figure 4:
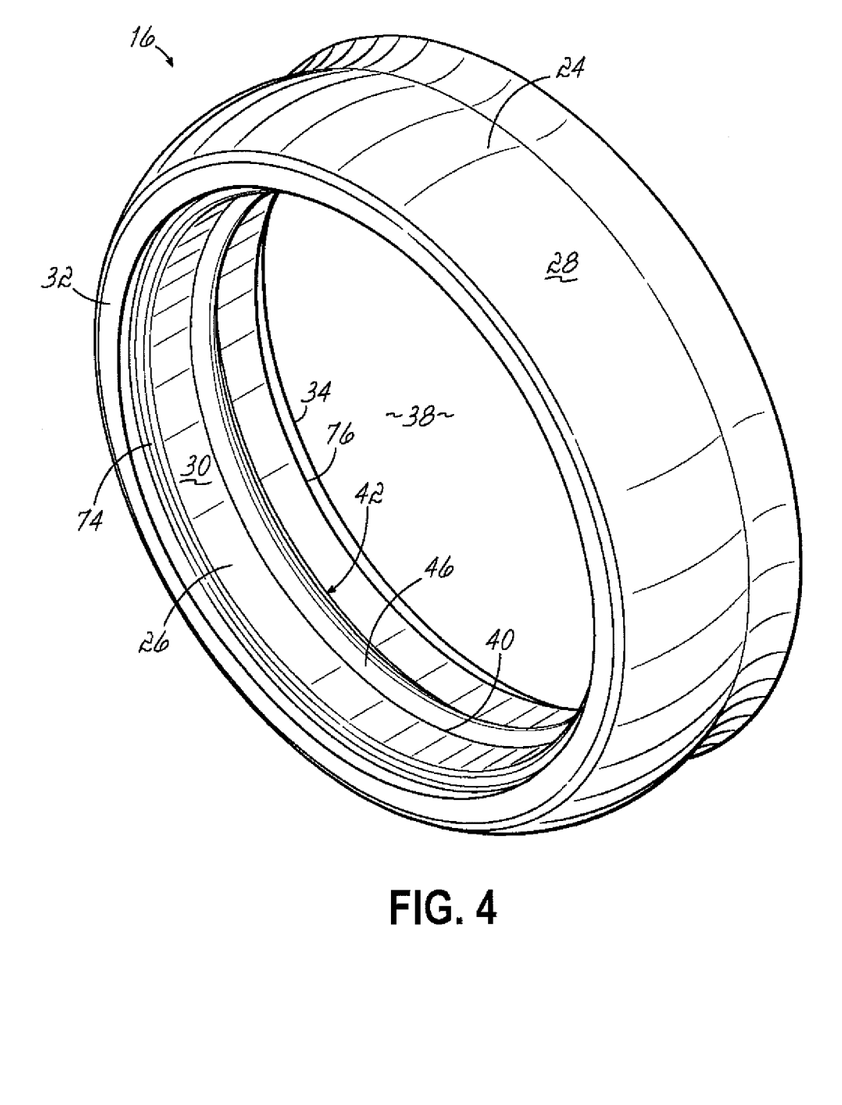
FIG. 4 is a perspective view of an exemplary embodiment of an annular ring received within a tire body of the wheel assembly of FIG. 2.
Figure 5:
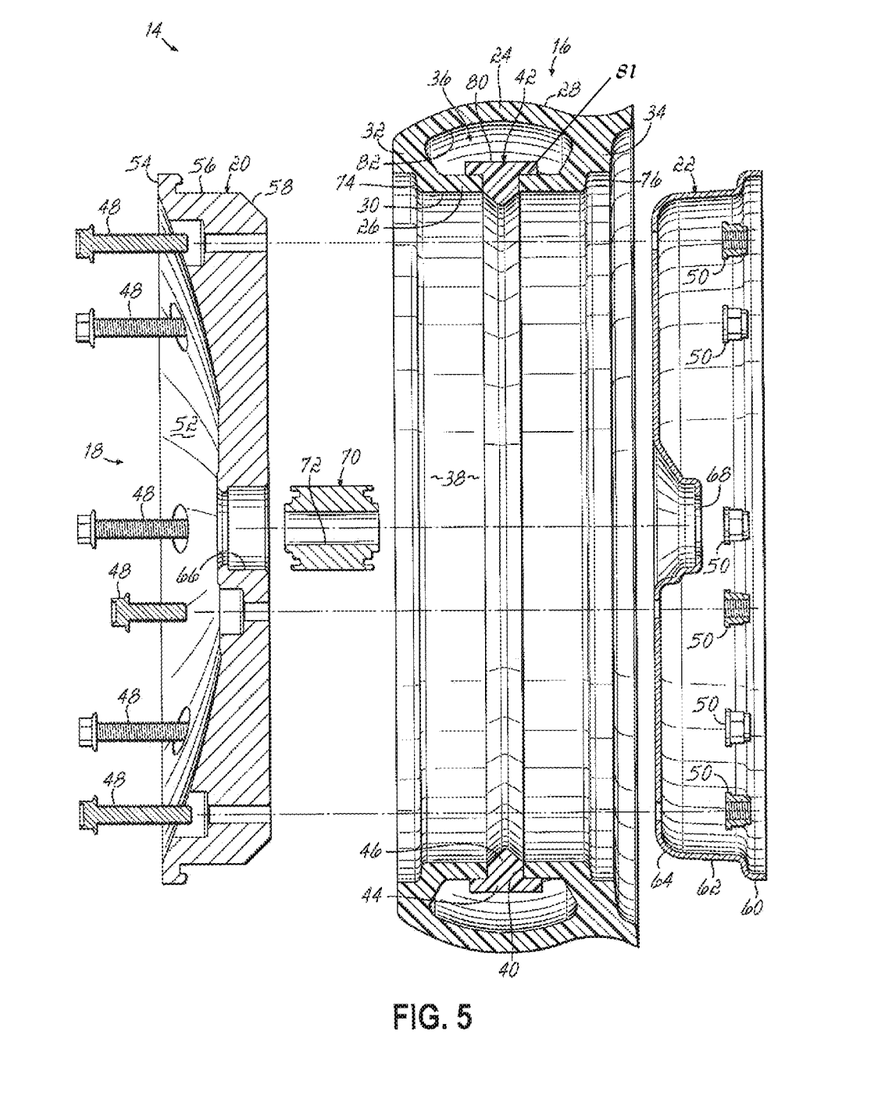
FIG. 5 is an exploded cross-section view of the wheel assembly of FIG. 2 taken along section line 5-5.

With respect to FIGS. 3-5, the exemplary wheel assembly 14 further includes a circumferential slot 40 configured to receive an annular ring 42 for mounting the tire body 16 to the hub 18. When assembled, the circumferential slot 40 extends radially inward through the inner wall 26 from the annular pocket 36 to the axial hole 38. The annular ring 42 includes an outer band portion 44 and a tab portion 46 projecting radially inward from the band portion 44. The outer band portion 44 is relatively wider than the circumferential slot 40. In turn, the band portion 44 is captured within the annular pocket 36, whereas the tab portion 46 projects inward through the circumferential slot 40, beyond the inner wall 26, and into the axial hole 38 for operatively engaging the hub 18.

In this embodiment, the exemplary hub 18 includes the outer hub half 20 removably connected to the inner hub half 22 via a plurality of fasteners, such as a plurality of cap screws 48 and a respective plurality of nuts 50. The outer hub half 20 has a generally concave outer face 52 and an outer annular lip 54 projecting radially outward from the outer face 52. Adjacent to the outer annular lip 54, the outer hub half 20 has a generally cylindrical portion 56 that extends from the outer annular lip 54 to a first circumferential chamfer 58. Similarly, the inner hub half 22 has an inner annular lip 60 projecting radially outward therefrom. Adjacent to the inner annular lip 60, the inner hub half 22 has a generally cylindrical portion 62 that extends from the inner annular lip 60 to a second circumferential chamfer 64. Both the outer and inner hub halves 20, 22 include respective central apertures 66, 68 that are axially aligned with the axial hole 38 discussed above. In this embodiment, the hub 18 further includes a bearing 70 having a central bore 72 that similarly aligns with the axial hole 38. The bearing 70 is configured to rotatably support the remainder of the wheel assembly 14 on an axle (not shown) of the row crop unit 12 (see FIG. 1) by receiving the axle (not shown) within the central bore 72. It will be appreciated that the wheel assembly 14 may be assembled with alternative hubs formed of one or more portions having any suitable shape that is configured to support the tire body 16.

Figure 6:
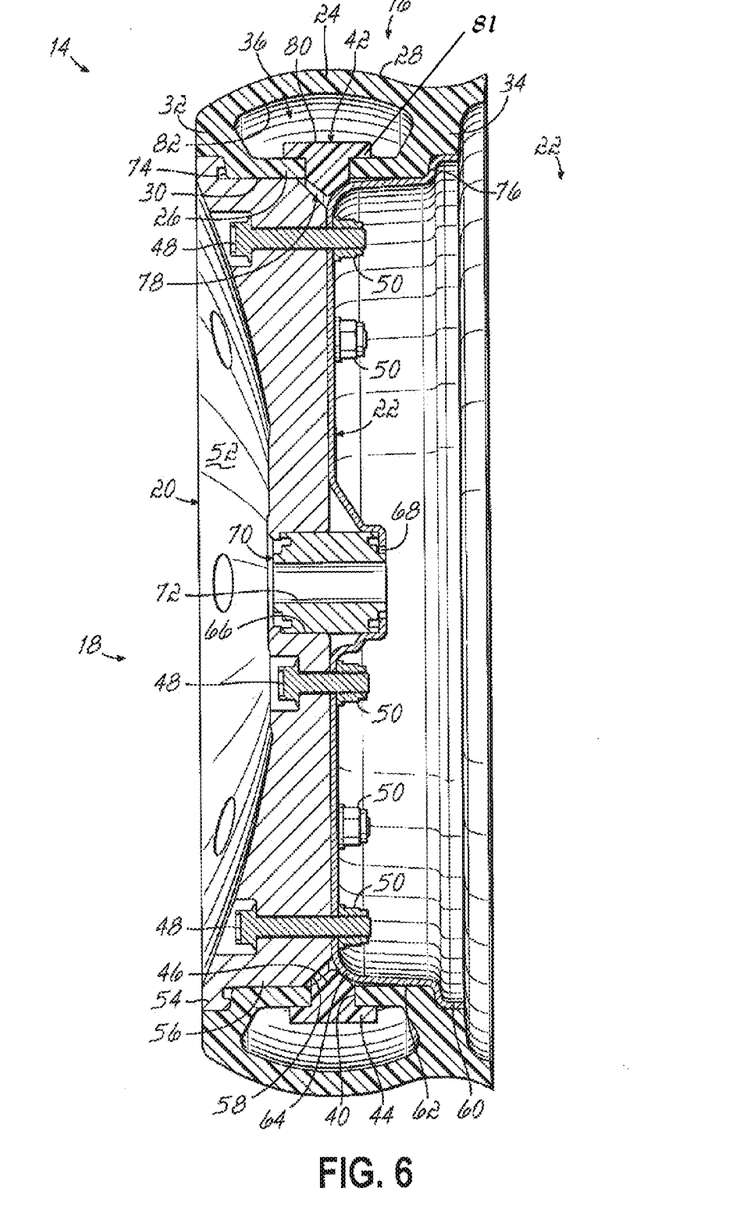

As shown in FIG. 5 and FIG. 6, the tire body 16 mounts to the hub 18 by securing the tire body 16 in an axial direction and a transverse direction on the hub 18. As described herein, the transverse direction is generally perpendicular to the axial direction. With respect to the transverse direction, the cylindrical portions 56, 62 are received within the axial hole 38 and sized to generally abut against the inner surface 30 of the inner wall 26. With respect to the axial direction, the outer annular lip 54 engages an annular portion 74 of the outer sidewall 32, whereas the inner annular lip 60 engages an annular portion 76 of the inner sidewall 34. In turn, the inner wall 26 is captured between the outer and inner annular lips 54, 60 and secured against the generally cylindrical portions 56, 62.

With the outer and inner hub halves 20, 22 connected together as shown in FIG. 6, the hub 18 defines an annular groove 78 for further securing the tire body 16 to the hub 18. More particularly, the annular groove 78 circumscribes the hub 18 between the first and second circumferential chamfers 58, 64. According to the exemplary embodiment, the band portion 44 and tab portion 46 of the annular ring 42 generally define a T-shaped cross-section. The tab portion 46 projects inward beyond the inner wall 26 of the tire body 16 and into the annular groove 78 of the hub 18 and is captured between the outer and inner hub halves 20, 22. In turn, the band portion 44 is captured within the annular pocket 36. Thus, the annular ring 42 is effectively locked to the hub 18. In the event of differences in axial loading between the tire body 16 and the hub 18, the annular ring 42 and at least one of the outer and inner annular lips 54, 60 are configured to hold the tire body 16 securely to the hub 18.

According to the exemplary embodiment, the circumferential slot 40 and annular groove 78 are centrally located about the tire body 16 and hub 18 respectively. Thereby, the annular ring 42 in cooperation with the circumferential slot 40 and the annular groove 78 is configured to centrally align the tire body 16 on the hub 18 for a centered predetermined mounting position. Alternatively, the annular groove 78 and the circumferential slot 40 may be positioned elsewhere about the tire body 16 and hub 18, respectively, for another predetermined mounting position.

Furthermore, the semi-pneumatic tire body 16 is configured to compress and collapse a portion of the annular pocket 36 under transverse loading, such as when the outer wall 24 is being compressed against a ground surface. In turn, the band portion 44 of the annular ring 42 also includes an outer circumferential surface 80 configured to support an interior surface 82 of the annular pocket 36 in such an overloaded compression. The band portion 44 also includes an inner circumferential surface 81 that extends over a portion of the inner wall 26 of the tire body 16. According to the exemplary embodiment, the circumferential surface 80 is generally smooth. However, it will be appreciated that the circumferential surface 80 may include one or more ridges or flats for similarly supporting the interior surface 82 in case of overloading the tire body 16.

According to the exemplary embodiment of the wheel assembly 14, the annular ring 42 is integrally formed as a unitary piece, but is separate from the tire body 16 and hub 18. The annular ring 42 may be formed from a first material, whereas the hub 18 and tire body 16 may be formed from second and third materials, respectively, that are different from the first material. Accordingly, material selection for the tire body 16, hub 18, and annular ring 42 may be optimized for any particular application, such as the gauge wheel assembly 14. One such optimization may be to form the annular ring 42 from a lighter weight material than the tire body 16 in order to reduce the overall weight of the wheel assembly 14. By way of further example, the tire body 16 may be rubber material, such as styrene-butadiene rubber, the hub 18 may be metallic, and the annular ring 42 may be polymer, such as glass filled nylon 6. Alternatively, the tire body 16 may be formed from a fiber reinforced material, natural rubber material, styrene rubber material, neoprene polychloroprene material, ethylene propylene diene monomer material, and/or a thermoplastic material. The annular ring 42 may alternatively be formed from low density polyethylene, high density polyethylene, nylon, polypropylene, and/or metallic material, such as steel or aluminum. However, it will be appreciated that the tire body 16, hub 18, and annular ring 42 may be formed of any suitable material for forming the wheel assembly 14. It will be further appreciated that the annular ring 42 may be formed from multiple pieces or be integrally formed as a unitary piece with the hub 18 as described below in greater detail with respect to alternative embodiments.

Figure 7:
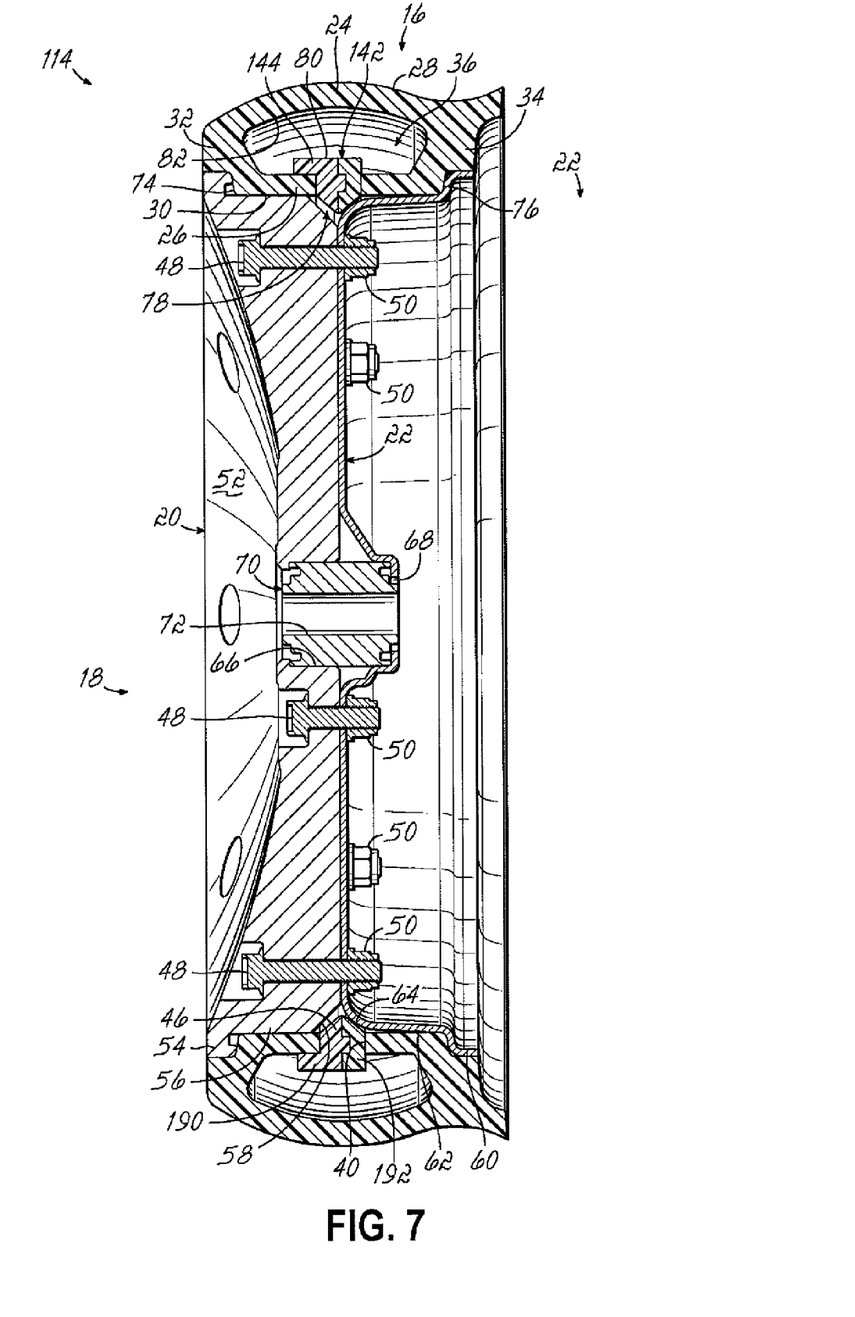
FIG. 7 is a cross-section view of a second exemplary embodiment of a wheel assembly in accordance with the principles of the present disclosure.

In this respect, FIG. 7 depicts a second exemplary embodiment of a wheel assembly 114, which includes the tire body 16 and hub 18, as discussed above, together with an annular ring 142. The annular ring 142 includes a first ring body 190 and a second ring body 192, which collectively define the tab portion 46 and a band portion 144. The first ring body 190 and second ring body 192 include interlocking features, such as a groove and tongue. In an embodiment, the joint of the first ring body 190 and second ring body 192 at the interface of the interlocking may be reinforced by a mechanical fastener or an adhesive. In an embodiment, rather than defining a T-shaped annular ring, the annular ring 142 defines an L-shaped protrusion forming only one lip, or tab portion 46, to grip an internal surface of the annular pocket 36 of the tire body. Similar to the annular ring 42 (see FIG. 6), the band portion 144 is captured within the annular pocket 36 and the tab portion 46 projects beyond the inner wall 26 to be captured within the annular groove 78. In this embodiment, similar reference numbers indicate similar features discussed above with respect to FIGS. 1-6.

Figure 8:
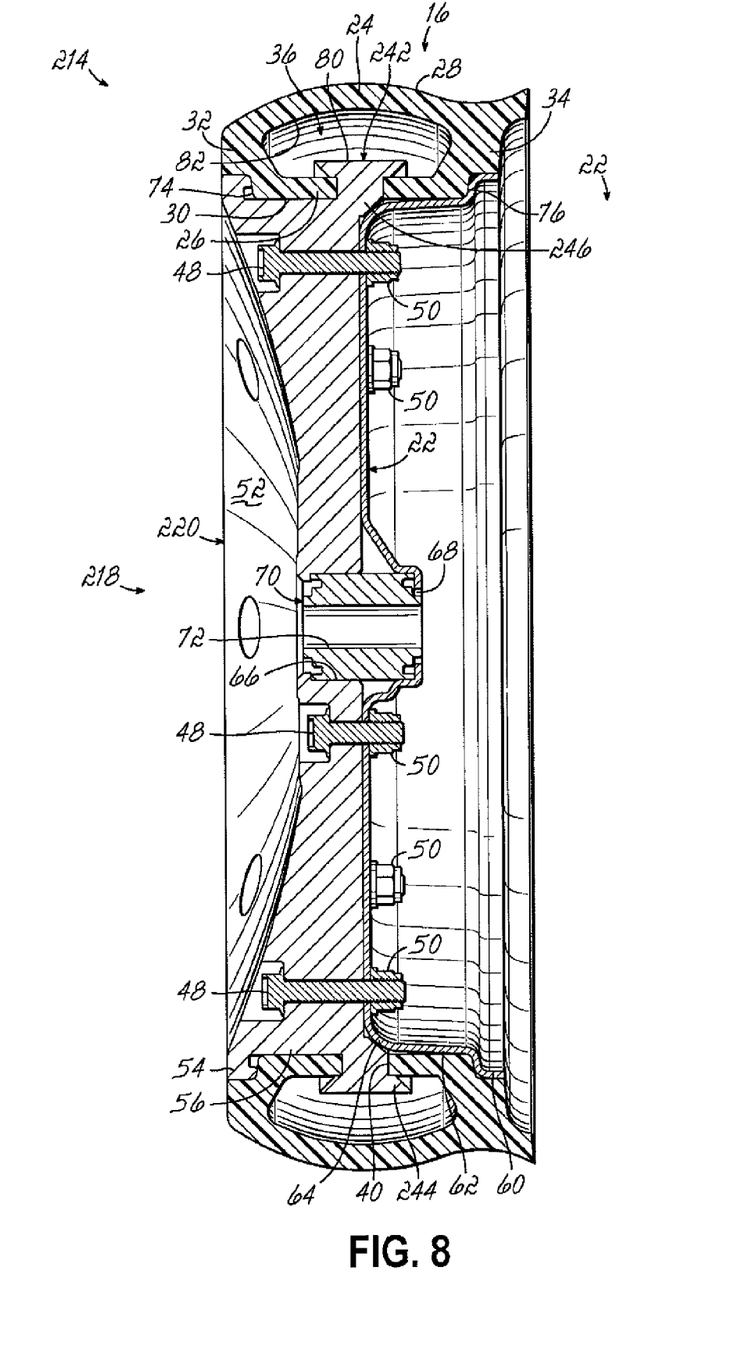
FIG. 8 is a cross-section view of a third exemplary embodiment of a wheel assembly in accordance with the principles of the present disclosure.

FIG. 8 depicts a third exemplary embodiment of a wheel assembly 214 that includes the tire body 16, a hub 218, and an annular ring 242, in which similar reference numbers also indicate like features discussed above. Rather than including the annular groove 78 (see FIG. 6) for capturing the annular ring 42 (see FIG. 6), the annular ring 242 is integrally formed as a unitary piece with at least a portion of the hub 218. More particularly, the annular ring 242 projects radially outward from an outer hub half 220, which also includes the outer annular lip 54 and the generally cylindrical portion 56. Accordingly, the tab portion 246 extends through the circumferential slot 40 between a band portion 244 and the outer hub half 220. As discussed above, the band portion 244 is captured within the annular pocket 36 for securing the tire body 16 to the hub 218.

In order to form the wheel assembly 14 as shown in FIGS. 1-6, the tire body 16 may be molded to include the circumferential slot 40, which is configured to receive the annular ring 42. Notably, due to the access to the annular pocket 36 provided by the circumferential slot 40, the tire body 16 may be molded using a wide variety of molding techniques that would otherwise be unavailable to conventional wheel assemblies. According to an exemplary embodiment, the tire body 16 is molded to shape using single-stage injection molding. However, it will be appreciated that various other molding techniques, such as compression molding, resin transfer, vacuum molding, co-injection molding, gas-assisted multi-component molding, structural foam molding, and microcellular molding, may be used to form the tire body 16 without splices or with a reduced number of splices to reduce variation and improve consistency among a plurality of formed tire bodies 16. While the method of forming the wheel assembly 14 is described below in reference to the first exemplary wheel assembly 14, it will be appreciated that this description applies similarly to the second and third embodiments of the wheel assemblies 114, 214 shown in FIG. 7 and FIG. 8.

With respect to FIGS. 1-6, the annular ring 42 may be positioned within the circumferential slot 40 and secured to the tire body 16 such that the annular ring 42 projects radially inward through the circumferential slot 40 to the axial hole 38. More particularly, the annular ring 42 may be secured to the tire body 16 by inserting the band portion 44 through the circumferential slot 40 and into the annular pocket 36. To accommodate the band portion 44, the inner wall 26 resiliently deforms and, once the band portion 44 passes through the circumferential slot 40, the inner wall 26 generally returns to its formed shape. Thereby, the inner wall 26 captures the band portion 44 within the annular pocket 36, and the tab portion 46 extends radially inward through the circumferential slot 40 and beyond the inner wall 26.

With the tire body 16 and annular ring 42 positioned between the outer and inner hub halves 20, 22, the outer and inner hub halves 20, 22 may be brought against each other within the axial hole 38. The outer annular lip 54 engages the outer sidewall 32, and the inner annular lip 60 engages the inner sidewall 34. In turn, the inner wall 26 of the tire body 16 is captured between the outer and inner annular lips 54, 60 once each of the cap screws 48 threadably engages its respective nut 50.

The tire body 16 may be further mounted to the hub 18 by operatively engaging the annular ring 42 with the hub 18. According to the exemplary embodiment, the outer and inner hub halves 20, 22 define the annular groove 78. The annular groove 78 essentially surrounds the annular ring 42 in the axial direction to capture the annular ring 42 and inhibit axial movement thereof. In turn, the inner wall 26 of the tire body 16 surrounds and abuts against the generally cylindrical portions 56, 62 to inhibit transverse movement of the hub 18 relative to the tire body 16. The bearing 70 may then be operatively connected to the agricultural implement, such as the agricultural seeder 10, for use.

With respect to forming the wheel assembly 114 shown in FIG. 7, the first and second ring bodies 190, 192 are assembled together to at least partially define the annular ring 142. According to the exemplary embodiment, the first and second ring bodies 190, 192 are assembled together and then positioned within the circumferential slot 40. Alternatively, the first and second ring bodies 190, 192 may be assembled within the circumferential slot 40. Of course, in either case, the annular ring 142 is separable from the hub 18. In contrast, the annular ring 242 shown in FIG. 8 operatively engages the outer hub half 220 by being integrally formed as a unitary piece with the outer hub half 220. Thus, the annular ring 242 and at least a portion of the hub 218 are simultaneously positioned within the axial hole 38 for assembly.

While the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method and illustrative examples shown and described. Accordingly, departures may be from such details without departing from the scope of the general inventive concept.

What is claimed is:

1. A wheel assembly for an agricultural implement, comprising:
    a tire body having an inner wall and an outer wall collectively defining an annular pocket therebetween, the inner wall defining a central, axial hole through the tire body for receiving a hub;
    a circumferential slot extending through the inner wall of the tire body from the annular pocket to the axial hole; and
    an annular ring received within the annular pocket and projecting radially inward through the circumferential slot to the axial hole, the annular ring configured to operatively engage the hub such that the tire body mounts to the hub,
    wherein the annular ring further comprises a band portion captured within the annular pocket; and a tab portion having a width that is less than the band portion and projecting radially inward from the band portion, through the circumferential slot, and beyond the inner wall, the tab portion configured to operatively engage the hub, and
    wherein the band portion is generally transverse to the tab portion such that a cross-section of the annular ring is generally T-shaped.

2. The wheel assembly of claim 1, wherein the band portion includes an outer circumferential surface configured to support the outer wall of the tire body being compressed toward the inner wall.

3. The wheel assembly of claim 1, wherein the tire body is formed from a first material and the annular ring is formed from a second material that is different from the first material.

4. The wheel assembly of claim 1, wherein the annular ring is defined by a single, unitary ring body.

5. The wheel assembly of claim 1, wherein the annular ring comprises a first ring body and a second ring body, and the second ring body is separable from the first ring body.

6. The wheel assembly of claim 1, wherein the annular ring is configured to be separable from the hub.

7. The wheel assembly of claim 1, further comprising:
    at least a portion of a hub positioned within the axial hole, wherein the annular ring is integrally formed as a unitary piece with the portion of the hub.

8. The wheel assembly of claim 7, wherein the hub includes a first hub body and a second hub body, the first hub body has a first annular lip, the second hub body has a second annular lip, the tire body includes opposing first and second sidewalls, and the first annular lip engages the first sidewall and the second annular lip engages the second sidewall to capture the tire body between the first and second hub bodies.

9. The wheel assembly of claim 1, further comprising:
    a hub defining an annular groove, wherein the annular groove captures the annular ring therein.

10. The wheel assembly of claim 9, wherein the hub includes a first hub body connected to a second hub body, and the first and second hub bodies collectively define the annular groove to capture the annular ring therebetween.

11. The wheel assembly of claim 10, wherein the first hub body has a first annular lip, the second hub body has a second annular lip, the tire body includes opposing first and second sidewalls, and the first annular lip engages the first sidewall and the second annular lip engages the second sidewall to capture the tire body between the first and second hub bodies.

12. The wheel assembly of claim 1, wherein an interior circumferential surface of the cross-section of the annular ring engages an inner surface of the annular pocket of the tire body.

13. A method of forming an agricultural wheel assembly including a tire body, an annular ring, and a hub, the tire body having an inner wall and an outer wall collectively defining an annular pocket therebetween, the inner wall defining a central, axial hole through the tire body and having a circumferential slot extending therethrough from the annular pocket to the axial hole, the method comprising:
    positioning the annular ring within the circumferential slot; and
    securing the annular ring to the tire body such that the annular ring projects radially inward through the circumferential slot to the axial hole, and such that an inner circumferential surface of the annular ring extends over a portion of an inner surface of the annular pocket of the tire body.

14. The method of claim 13, wherein the annular ring includes a circumferentially extending band portion and a tab portion projecting radially inward from the band portion, and securing the annular ring further comprises:
    inserting the band portion through the circumferential slot;
    capturing the band portion within the annular pocket; and
    extending the tab portion through the circumferential slot such that the tab portion projects radially inward to the axial hole.

15. The method of claim 13, further comprising:
assembling a first ring body to a second ring body to at least partially define the annular ring.

16. The method of claim 13, further comprising:
positioning the hub within the axial hole; and
mounting the tire body to the hub such that the annular ring is operatively engaged with the hub.

17. The method of claim 16, wherein the hub includes an annular groove and mounting the tire body further comprises:
capturing the annular ring within the annular groove.

18. The method of claim 17, further comprising:
connecting a first hub body to a second hub body to assemble the hub and define the annular groove therebetween; and
engaging a first sidewall of the tire body with the first hub body and engaging a second sidewall of the tire body with the second hub body to capture the tire body between the first and second hub bodies.

19. The method of claim 16, wherein the annular ring is integrally formed as a unitary piece with at least a portion of the hub and mounting the tire body further comprises:
connecting a first hub body to a second hub body to assemble the hub having the annular ring projecting radially therefrom; and
engaging a first sidewall of the tire body with the first hub body and engaging a second sidewall of the tire body with the second hub body to capture the tire body between the first and second hub bodies.

* * * * *